United States Patent [19]

Lepinoy

[11] Patent Number: 5,009,318

[45] Date of Patent: Apr. 23, 1991

[54] METHOD, DEVICE AND PADDED PRODUCT FOR MAINTAINING AN OBJECT

[75] Inventor: Dominique Lepinoy, Dijon, France

[73] Assignee: Lepinoy Industrie, Dijon, France

[21] Appl. No.: 492,251

[22] Filed: Mar. 9, 1990

Related U.S. Application Data

[63] Continuation of Ser. No. 139,254, filed as PCT FR87/00115 on Apr. 8, 1987, published as WO87/06209 on Oct. 22, 1987, abandoned.

[30] Foreign Application Priority Data

Apr. 9, 1986 [FR] France ................................. 86 05317
Aug. 26, 1986 [FR] France ................................. 86 12091

[51] Int. Cl.⁵ ............................................. B65D 81/20
[52] U.S. Cl. ................................. 206/524.8; 206/522; 5/450; 5/455; 128/78; 128/89 R; 128/DIG. 20; 53/434; 53/472
[58] Field of Search ................... 206/522, 524.8, 584; 383/2, 38, 102, 103; 53/266 R, 403, 434, 472, 512; 5/450, 455, 456; 128/78, 89 R, DIG. 20; 141/65, 114, 68, 313, 67

[56] References Cited

U.S. PATENT DOCUMENTS

| | | | |
|---|---|---|---|
| 2,579,036 | 12/1951 | Edelman | 206/584 |
| 3,138,248 | 6/1964 | Abbott | 206/522 |
| 3,285,295 | 11/1966 | Titchenal et al. | 141/68 |
| 3,307,318 | 3/1967 | Bauman | 53/434 |
| 3,389,534 | 6/1968 | Pendleton | 206/522 |
| 3,412,521 | 11/1968 | Bauman | 53/472 |
| 3,419,134 | 12/1968 | Fitts | 206/522 |
| 3,468,311 | 9/1969 | Gallagher | 5/455 |
| 3,494,457 | 2/1970 | Titchenal | 206/524.8 |
| 3,515,267 | 6/1970 | LaRocca et al. | |
| 3,689,945 | 9/1972 | Laerdal | 5/450 |
| 3,716,082 | 2/1973 | Green | 141/68 |
| 3,762,404 | 10/1973 | Sakita | 128/78 |
| 3,980,226 | 9/1976 | Franz | 206/524.8 |
| 4,190,158 | 2/1980 | Ambrose | |
| 4,213,213 | 7/1980 | Burnett | 5/450 |
| 4,274,169 | 6/1981 | Standiford | |
| 4,425,676 | 1/1984 | Crane | 5/455 |
| 4,426,945 | 1/1984 | A-Yan | |
| 4,569,082 | 2/1986 | Ainsworth | |
| 4,620,633 | 11/1986 | Lookholder | 206/524.8 |
| 4,709,819 | 12/1987 | Lattuada et al. | 53/434 |
| 4,793,123 | 12/1988 | Pharo | 53/472 |

FOREIGN PATENT DOCUMENTS

| | | |
|---|---|---|
| 2018605 | 12/1970 | Fed. Rep. of Germany . |
| 1270443 | 7/1961 | France . |
| 1437194 | 3/1966 | France . |
| 1553180 | 12/1968 | France . |
| 2190096 | 1/1974 | France . |
| 2449050 | 9/1980 | France . |
| 2493268 | 5/1982 | France . |
| 341910 | 1/1931 | United Kingdom . |
| 533932 | 2/1941 | United Kingdom . |
| 1095311 | 12/1967 | United Kingdom . |
| 1463672 | 2/1977 | United Kingdom ................ 5/450 |
| 2125079 | 3/1984 | United Kingdom . |
| 2148093 | 5/1985 | United Kingdom . |
| 85/01272 | 3/1985 | World Int. Prop. O. . |

Primary Examiner—David T. Fidei
Attorney, Agent, or Firm—Bacon & Thomas

[57] ABSTRACT

An apparatus and a method are disclosed for cushioning and maintaining an object by a device having a quantity of granular material that is located in a retaining element. The retaining element is divided into compartments which contain the quantity of granular material. The retaining element and the granular material are located within an inner volume of a sealed housing. The retaining element is made from a material that is permeable to gas, but impermedable to the granular materials, while the sealed housing is made from a material that is impermeable to gas the effect of such compartmenting is to keep the granular material in place within the retaining elements, even when the housing is at atmospheric pressure in order to preserve a constant thickness of the device.

11 Claims, 4 Drawing Sheets

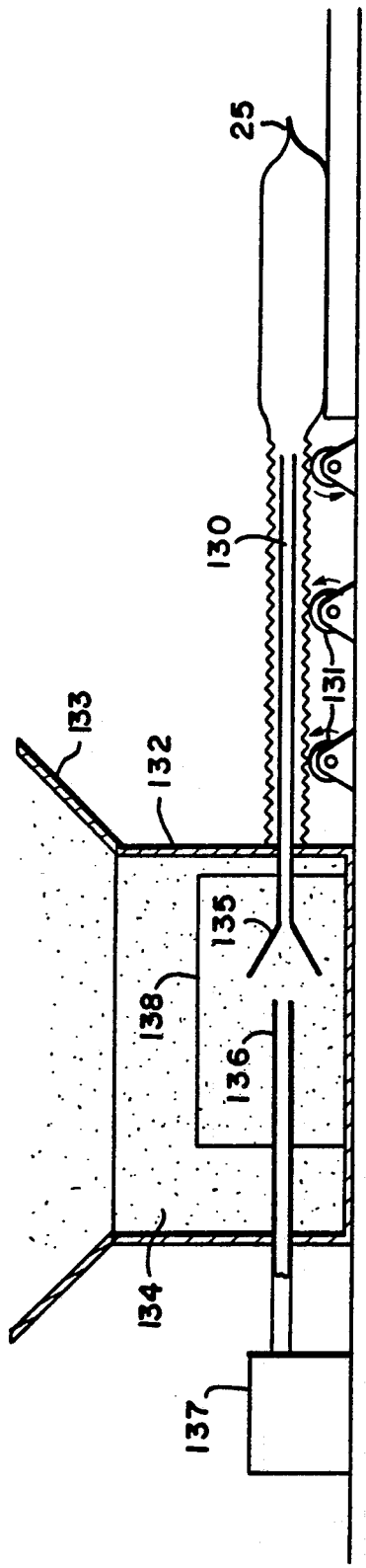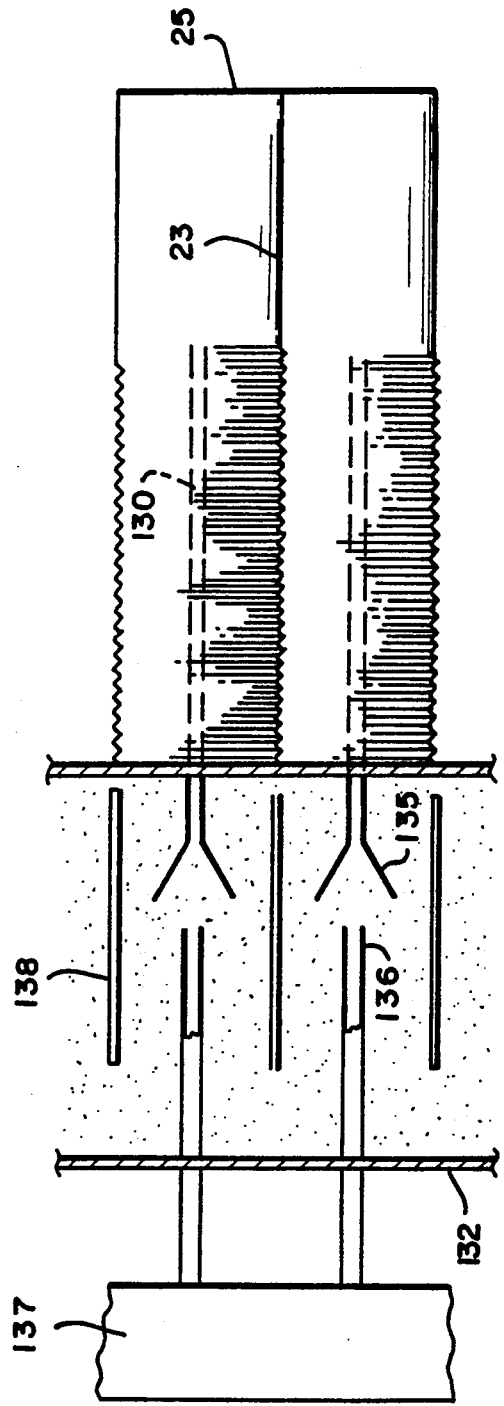

METHOD, DEVICE AND PADDED PRODUCT FOR MAINTAINING AN OBJECT

No. 07/139,254, filed as PCT FR87/00115 on Apr. 8, 1987, published as WO87/06209 on Oct. 22, 1987, now abandoned.

BACKGROUND OF THE INVENTION

The invention relates, in general, to maintaining in position an object or a body, by means of a granular material placed inside a sealed and depressurized housing.

According to these two documents, the object or the body to be maintained is placed externally to the inside volume of the sealed housing containing the granular material. Said housing is wrapped around the object or body, while remaining external thereto. For certain objects of distorted outlines, the support that is obtained is not absolutely good.

Another drawback linked to the technique described in the aforesaid documents is that the granular material, being loose inside the sealed housings, has a tendency to accumulate irregularly in one area of the housing, under the effect of gravity for example, as long as rigidification is not, at least partly, obtained.

SUMMARY OF THE INVENTION

According to the invention, the object to be maintained or packed is actually placed inside the sealed housing, directly in the granular material. Said material can thus completely adopt the outline of the object and considerably improve the support. The granular material can be loose, or preferably, re-grouped in small air-permeable bags.

According to the invention, the grannular material is placed in retaining elements which are divided into compartments and placed in the inner volume of the housing. The effect of such compartmenting is to keep the granular material in its place, even when the housing is at atmospheric pressure, and to preserve a constant thickness thereof, which is a sign of its efficiency. The efficiency is indeed dependent, for a given weight and geometry of the object, of the thickness of the granular protection and of the depressurization.

Said retaining elements may be produced directly from the housing walls, but preferably, said elements are constituted independently of the housing, and positioned inside the housing.

Said elements are of course impervious to the granular material that they hold, but they are preferably to air so that the depressurization of the housing can be carried out in a very simple way.

Advantageously, the retaining elements are constituted by a mattress of juxtaposed tubes filled with said granular material. Said tubes have walls of supple material, advantageously a textile sheet which is elastic in a direction which is transverse to the longitudinal direction of the tubes.

The padded product according to the invention, designed first and foremost for filling compartments of sealed depressurized housings of any type whatsoever, has intrinsic qualities which enable it to be used in many other applications, especially when it is constituted by tubes of cellular-type fabric (netted gauze) filled with expanded polystyrene balls.

One method for producing such padded product consists in assembling two layers, by means of longitudinal seams closed by a transversal seam, and in injecting the granular material in the resulting blind spaces.

Said granular material is preferably injected horizontally by means of pipes of which the upstream end, which is placed inside a reverse of particle material, receives a jet of compressed air sent by an injector.

Another disadvantage of the devices disclosed in documents FR-A-1 270 443 and 1 437 194 is that they do not allow a compressive support.

It is also the aim of the invention to overcome this disadvantage with a general disposition permitting a considerable improvement of the possibilities of utilizing depressurized pouches.

According to the invention, the pouch may comprise, adjoined to the depressurized housing in the extending direction thereof, at least a second sealed housing, which may be filled with a fluid, granules, or a mixture of both, depending on the proposed applications.

The first housing is preferably divided into compartments, extending in its longitudinal direction, so as to prevent losseness of the granules. To the same end, a granule-maintaining material can be provided, preferably a fibrous material for trapping the granules.

The invention is more particularly applicable to the production of packages and of supporting devices, as well as to the production of mattresses, such as bedsores-preventing mattresses.

BRIEF DESCRIPTION OF THE DRAWINGS

Other characteristics and advantages of the invention will emerge from the following description of several embodiments. Reference will be made to the accompanying drawings in which:

FIG. 12 is a diagrammatical elevation view of a filling installation for the padded product such as shown in FIG. 5.

FIG. 13 is a diagrammatical plan view of the filling installation of FIG. 12.

DETAILED DESCRIPTION OF THE PREFERRED EMBODIMENTS

Figure 1:
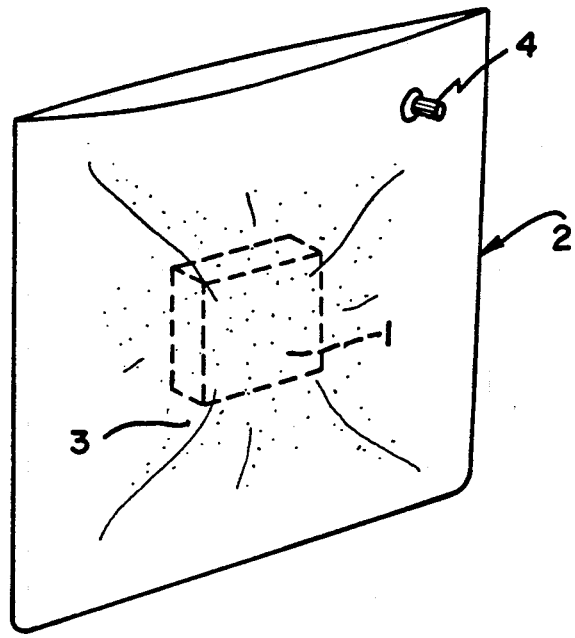
FIG. 1 is a perspective view of a pouch used in a first method for maintaining and packaging an object according to the invention.

According to FIG. 1, the object 1 to be maintained is placed inside a bag or pouch 2, closed on three sides, containing also the granular material 3 loosely distributed around the object 1.

The pouch may be of the type used for vacuum-packaging and be in a supple and tight material, such as polyurethane or polyvinyl chloride or other equivalent plastic materials, which may optionally be arranged in several thicknesses.

After placing the object and the granular material inside the bag, the open side of said bag is closed in tight manner by any method (adhesive bonding, double-face adhesive means, high-frequency welding or heat-sealing), in which a press with rigid or semi-rigid jaws is used for compressing the two edges of the bag one on the other.

Another method consists in folding the open end of the bag twice, then again, four times, then eight times, etc., and in producing a compressive tying-up of these folds.

It is also possible to use the bag and closing method described in document FR-A-2 493 268, the teaching of which is incorporated herein by reference.

The bag has a nipple 4 comprising, in a manner known per se, a valve permitting, in cooperation with depressurizing means (vacuum-pump), the depressurization of the inside of the housing constituting the bag.

During the depressurization, the object is caught within the mass of maintaining material created by the differential pressure between the atmospheric pressure and the residual pressure inside the bag. The object is thus surrounded by a non-fragile compact mass. At any point on the object situated inside the supporting mass, the resultant of the forces applied thereon is negligible, because of the isotropy of the directions of the forces applied by the atmospheric pressure.

For packaging very delicate and hollow objects, presenting a narrow opening (such as a teapot), the object may be filled with light incompressible material.

The granular material can be of various types: crushed cork, sawdust, vermiculite, but preferably is expanded polystyrene balls.

According to the packaging principle illustrated with reference to FIGS. 2 and 3, the object to be protected is not placed inside the sealed housing, but outside thereof.

The housing can consist of sealed mattress 5 containing the granular material. The matress can be constituted of two PVC layers (2 to b 3 tenths of a millimeter thickness) welded all around their periphery 6, for example by high frequency welding, to contain the granular material, preferably balls of polystyrene.

In order to avoid excessive malleableness of the matress 5, a slight depressurization is created in the housing (through the valve-equipped nipple 7), before use, this slightly rigidifying the assembly.

Figure 3:
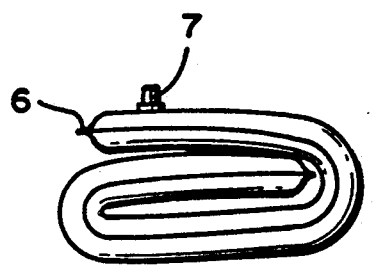
FIG. 3 is a side view of the matress of FIG. 2 which has been wrapped around the object.

The object to be protected 8 is placed on the mattress, and the matress is folded over itself and molded around the object (FIG. 3). Another stronger vacuum pumping operation is then effected (for example up to 800 mbar) to make the assembly rigid and to ensure the support and protection of the object.

Atmospheric air may be let in through the nipple 7 in order to release vacuum and the packed object, and the mattress is ready to be re-utilized.

The mattress 5 can have various forms and dimensions and can be used not only to entirely cover the object, but also to protect only part of it: for example, mattresses can be molded into angle pieces to protect the edges of a painting for transport purposes. Long and narrow mattresses (for example 2 m×0.13 m) can be used to form supporting bandages. Tests have shown that the support obtained is not substantially compressive. A self-gripping tape enables each winding of the bandage to be secured on the preceding one. The thickness of the band is kept constant due to the inner compartmenting of the bond as described hereinafter. If a high compression is required, the sealed housing, according to an embodiment to be described hereinafter. Other applications are possible for the tightening (for bonding purposes for example) and for haemostatis sleeves (when an antiseptic treatment is carried out beforehand).

Figure 4:
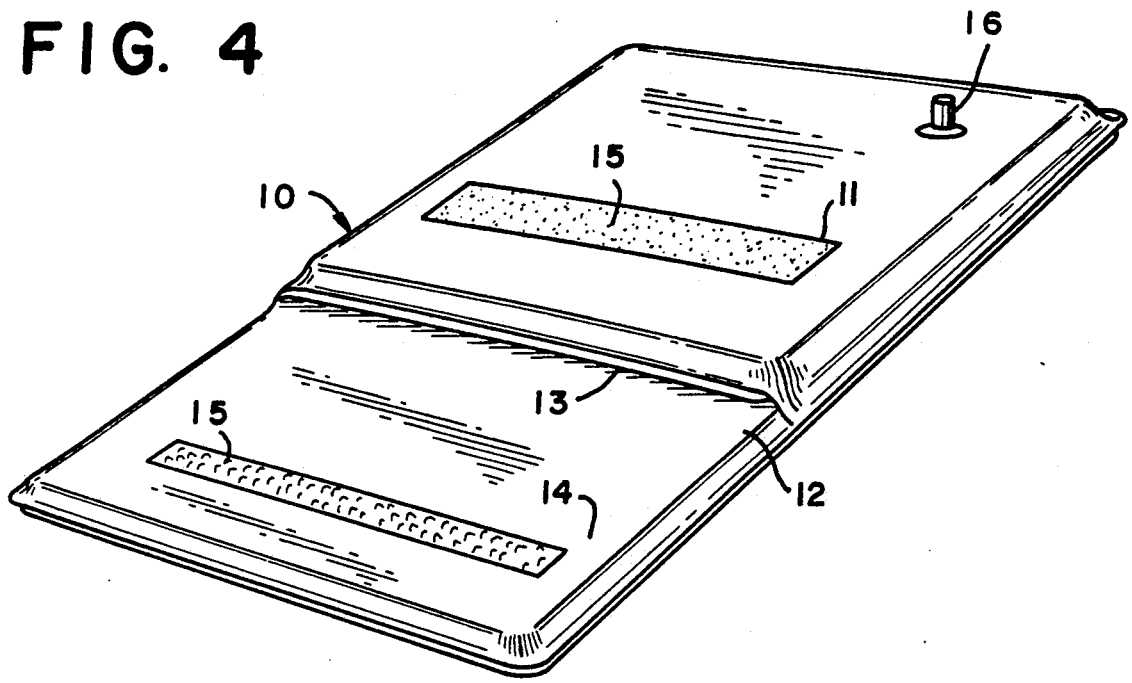
FIG. 4 is a perspective view of a packaging housing in envelope form according to the invention.

According to an embodiment illustrated in FIG. 4, the sealed housing is shaped as an envelope 10 of which the front wall 11 and back wall 12 are double, so as to define between their plies the volume of the housing, and to contain granular material. The object to be protected is slid into an opening 13 of the envelope between the double walls 11 and 12, then the double flap 14 is turned down over the front wall 11 to which it is fastened by a fastening means, such as for example two complementary strips 15 of the adhering velvet type. One only needs to draw the air out through the nipple 16 in order to drawn a vacuum such that the envelope 10 stiffens around the object to be protected. Said envelope 10 can contain, on its external surface, indicia relative to its routing by the postal services. In this particular embodiment, as in the preceding ones, it may be advantageous to produce each one of the plies, or at least one of the plies, of the double walls with an aluminum foil, in order to prevent heat tranfer through radiation (the transfer through convection being naturally eliminated during the containment) and to make the package isothermal.

The depressurization created in the housing according to the invention is dependent on how long the protective cocoon formed by the rigidified granular material is expected to last. Bags pressurized to 200 mbar have been found very satisfactory for protecting very delicate objects. Smaller depressurization is preferred when seeking visco-elastics effects.

The package obtained according to any one of the foregoing embodiments can be associated to inflatable elements in order to be placed inside a container (see for example documents FR-A-1 553 180, FR-A-2 190 096 ,FR-A-2 574 639).

Figure 2:
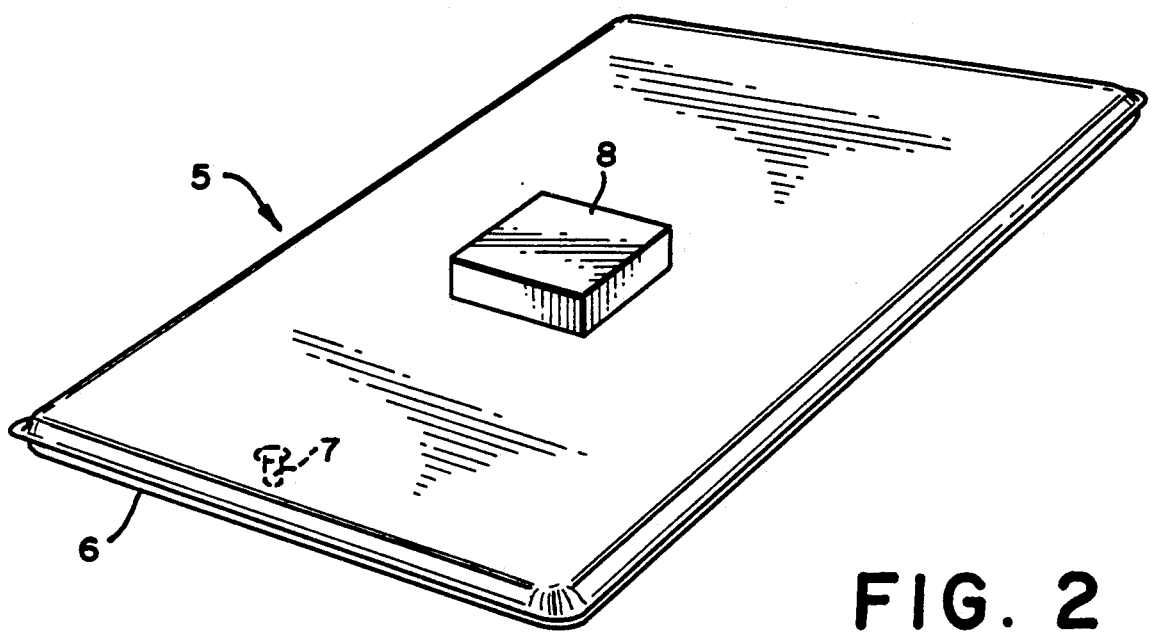
FIG. 2 is a perspective view of a mattresses laid flat, used in a second method for maintaining and packaging an object according to the invention.

Whether with the method according to FIG. 1 or with that according to FIGS. 2 to 4, it is highly advantageous to provide, inside the housing, retaining elements for the granular material. The retaining elements divide the inner volume of said housing into compartments, which will prevent any excessive accumulation of the material in a particular part of the inner volume, under the effect of gravity for example, before the depressurization. Such compartmenting must be impermeable to the granular material and permeable to gass (such as air) so as to enable the depressurization of the whole assembly in only one operation.

Although it is conceivable to produce the compartmenting directly with walls of the housing, it is more advantageous to produce it independently in the form of a mattress 20 of juxtaposed tubes, made of a flexible material impermeable to the granular material, and filled with said granular material. Said mattress 20 is then introduced into the sealed housing, singly or with other mattresses.

Figure 5:
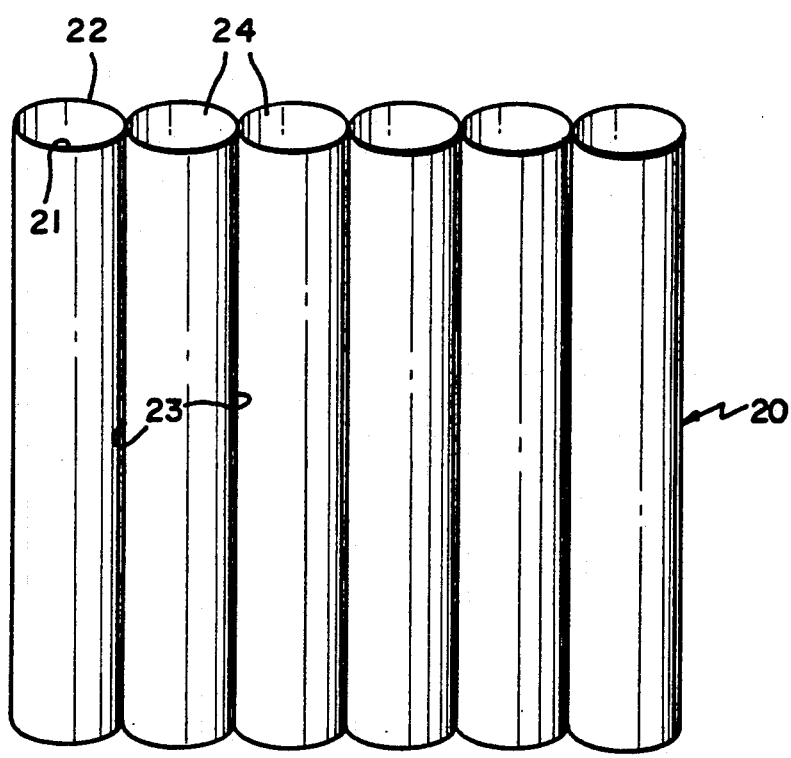
FIG. 5 is a front view of a padded product specifically designed for filling enclosures according to the invention.

FIG. 5 shows such a mattress 20. It is produced by assembling two layers 21,22 of fabric (in Nylon or polyester fibers for example) which are supple and aerated (so as to be air-permeable), so as to have longitudinal parallel seams 23 defining between them tubes 24 which are force-filled with polystyrene balls. The fabric of layers 21,22 is advantangeously produced by a meshwork extensible crosswise to the tubes. This gives a certain transversal elasticity to the tubes, which enables a permanent gripping pressure to be maintained on the filling material, improves the stability of the mattress and makes it more malleable.

The fabric is preferably practically inextensible in a longitudinal direction, so that the mattress cannot be deformed when it is suspended.

The size of the mesh is less than the dimensions of the granular filling material: in the case where the balls are formed of pre-expanded polystyrene, the diameter of the balls is generally between one and two millimeters. When the mattress is used inside a depressurized envelope, the size of the mesh is selected to be sufficiently large, compared with the preceding limitations, to allow depressurization as quickly as possible.

The seams 23 are generally regularly spaced, for example of 5, 7.5 or 10 cm, corresponding to a diameter of the tubes 24 of 3.2, 4.8 and 6.6 cm.

The mattress 20 according to the invention, although advantageously used in combination with sealed housings, can also be used as is for varied applications.

It can be used as an insulating cover (swimming pools, lorries, containers), or as a surface or subsurface covering from walls, ceilings, floors, with a sound and heat insulating effect, and with an original decorative effect.

It can also be used for making drapes, bedcovers, mattress and pillow covers because of its comfortable contact which distributes the pressures and gives a sense of ventilated warmth. It can be used for producing isothermal clothing such as helmets, leg guards, gloves or various protections. It can also be used to produce animals' beds or litters.

Depending on the intended applications, the balls of polystyrene can undergo a coloring, antistatic, antiseptic or other such treatments. For example, the padded product according to the invention can serve, after an antiseptic treatment, as a bedsores-preventing mattress. The textile layers are permeable to liquids, so that the mattress can drain any liquids collecting therein.

Although the balls of pre-expanded polystyrene constitute the preferred filling material, other light and resilient materials are also suitable.

As indicated hereinabove, the depressurized housing according to the invention is preferably associated with at least a second sealed housing, containing a fluid or granules.

Figure 6:
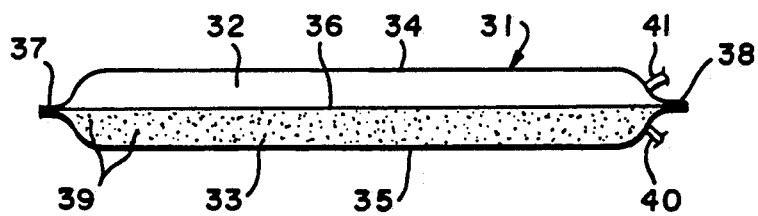
FIG. 6 is a diagrammatical cross-section of a first embodiment of a multiple housing.

In FIG. 6, the pouch 31 comprises two adjacent housings 32 and 33 defined by flexible and deformable outer walls 34 and 35, of which the lateral edges 37,38 and longitudinal edges are thightly assembled together by adhesive bonding, autogenous welding, or other means.

The housing 33 contains a multiplicity of balls 39, for example made of expanded polystyrene, deposited loosely and in sufficient quantity to form a certain thickness.

Housings 32 and 33 also have valves 40 and 41, which are connectable with depressurization or compression means, such as a double-acting pump.

Housing 33 containing the balls is designed to be depressurized so as to be made rigid while retaining the natural or imposed shape that it had before being depressurized.

As to housing 32, its filling up is dependent on the uses to be made of the pouch, as will be explained hereinafter.

Figure 7:
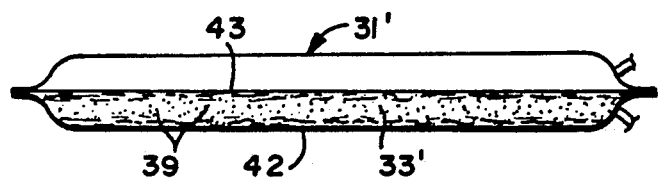
FIG. 7 is a diagrammatical cross-section of a second embodiment of a multiple housing.

FIG. 7 pouch 31 is an improvement of the pouch shown in FIG. 6, according to which the housing 33' comprises two layers 42,43 of a fibrous material, such as a synthetic wadding, between which the balls 39' are loosely deposited. Said balls are less inclined than in the previous embodiment illustrated in FIG. 6 to accumulate in one part of the housing when the pouch is handled before being depressurized, due to the fact that they remain slightly trapped by the fibers protecting from the layers 42 and 43. Also, at least for certain materials constituting the balls and the fibrous layers, static electricity phenomena occur, which hold them into place. The fibrous material layers 42,43 are, of course, porous and are crushed when the housing 33 is depressurized, but recovers them volume due to their elasticity if the depressurization stops.

The balls are even better kept in place if the pouch 31' or at least the layers 42,43 of the housing 33' are compartmented, for example by means of seams 44,45 parallel to the longitudinal and lateral edges 37',38'. Said seams 44,45 bring the layers 42,43 close together and define compartment 46 which are virtually sealed and prevent the passage of the balls, but which seams are not fluid-tight. Therefore, they cannot prevent the depressurization of the whole housing 33', which may be accomplished through only one valve 40'. Other comparmenting means can be used for the walls 34,35,36 as long as they do not affect the tightness thereof.

In particular, the preferred embodiment of the compartmenting is that which uses the a padded mattress product of the type described hereinabove with reference to FIG. 5.

The pouches can have any shape and dimensions depending on the uses.

Figure 8:
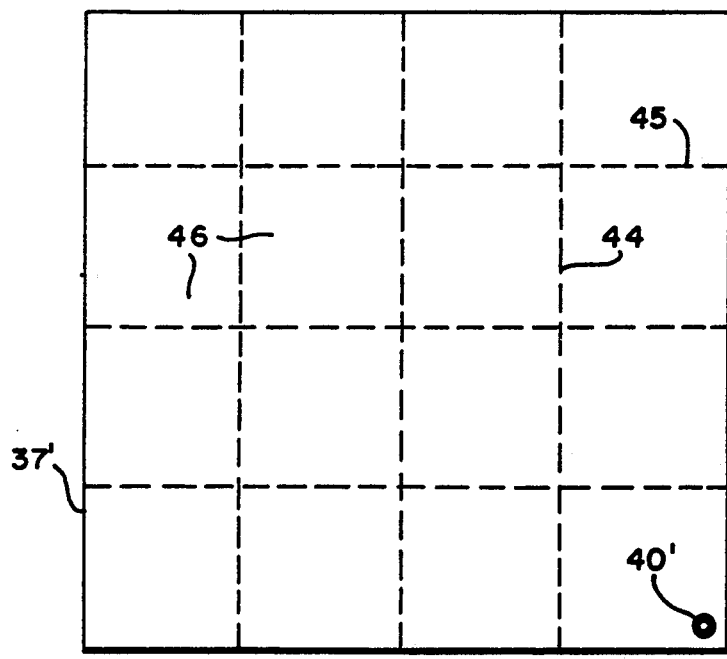
FIG. 8 is a plan view of a third embodiment of a multiple housing.
Figure 9:
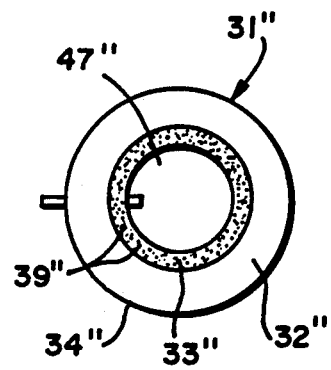
FIG. 9 is a front view of a fourth embodiment of a multiple housing.

For example, they can be flat, rectangular or square, as illustrated in FIGS. 6 to 8, or cylindrical as illustrated in FIG. 9 where the pouch 31" is shown to have an internal housing 33" filled with balls 39" and an external housing 32", both housing being defined by supple and deformable walls. External wall 34" of housing 32", for certain applications, can be relatively rigid, like the outside of a box. In this particular embodiment, it is possible to use a simple double acting pumping means to accomplish the depressurization of one of the housings and the compression of the other.

The pouch 31" shown in FIG. 9 can, for example, be used for packing delicate objects which are placed in the internal space 47". First, the object is placed in this space when the housing 32",33" are at atmospheric pressure; then, the balls-containing housing 33" is depressurized, which can optionally be achieved by directing the air exhausted from housing 33" into housing 32". Thus, housing 33" rigidifies around the object placed in the space 47" and this rigid housing is pneumatically suspended by way of the inflated housing 32".

Depending on the degree or the rate of pressurization of housing 32" with respect to the depressurization of housing 33", it is possible to improve the molding of the latter, which is not yet completely rigid, over the wrapped object.

The advantage of this device is that it retains a regular outer shape, which can fit in any type of standard package (cardboard boxes, special transporting cases, etc.).

Such a device is also suitable for producing splints or other limb-supporting devices.

In certain applications, the depressurizable housing can be placed on the outside, and the pressurizable housing on the inside.

One disadvantage of the device shown in FIG. 9 is that it requires to be produced in several sizes to accommodate various sizes of the objects to be packed.

This is why it is more advantageous to use a pouch 31 or 31' of the type of that shown in FIG. 6 to 8, which can be rolled around an object. The pouch 31 or 31' can be equipped with means for fastening it around the object, at least temporarily, until the rigid state caused by the depressurization is reached. Such means can consist, for example, of a self-gripping strip, of which the loop and hook elements are respectively provided on the faces 34 and 35 (or vice-versa) of the pouch.

Figure 11:
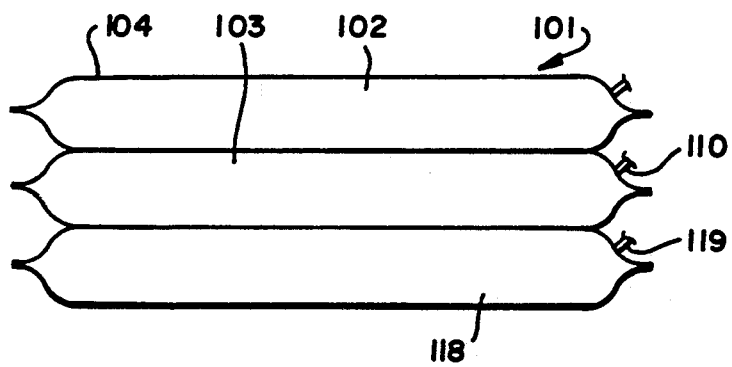
FIG. 11 is a diagrammatical cross-section of a fifth embodiment of a multiple housing designed to form a bedsores-preventing mattress.
Figure 10:
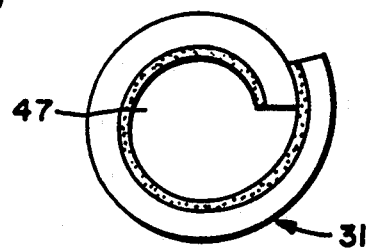
FIG. 10 is a front view of the first embodiment of multiple housing.

FIG. 11 shows a cross-sectional view of a pouch 101 with three contiguous sealed housings 102, 103 and 118, which pouch is designed to form, whether singly or in combination with other similar pouches, a bedsores-preventing mattress.

The housings can be produced separately, and superposed and interlocked, either permanently (by adhesive bonding, welding, etc.) or removably (by way of removable adhesive means).

The central housing 103 is filled with balls of resilient material and has a depressurizing valve 110. Said housing is designed to be molded around the patient, according to a known method, but in considerably improved conditions owing to the presence of the lower housing 118, equipped with a valve 119, which is filled with a liquid, or a mixture of liquid and balls, and designed to exert a uniform pressure towards the person leaning thereon. The form molded in this way contributes to reducing the ischaemic effect. The upper housing 102, which is in contact with the patient, is initially empty while the central housing 103 is being depressurized. Then it is filled with a fluid so as to form a cushion between the rigidified central housing 103 and the patient, threby improving comfort, constituting like a synovial pouch in an articulation, and, hence, reducing the friction and shear stresses which are in the origin of bedsores. Alternatively, it is possible to fill the house 102 with a mixture of balls and liquid, and to depressurize it slightly, the degree of depressurization being controlled to obtain the wanted suppleness and softness. The wall 104 of housing 102 which is in contact with the patient, is selected for its physiological and psychological comfort and should be of a sufficiently thick and/or rigid elastic material so as not to form creases.

The pouch shown in FIG. 6 can also be used for splints. In this case, the housing 32 is slightly inflated and the housing 33 slightly depressurized, so as to form a viscoelastic layer. The pouch is laid flat, the air-containing housing being underneath in order to distribute the pressures when the patient's body is settled on the granular housing. When the body is in the desired position, a substantial vacuum is created inside housing 33 in order to fix the form and hold the body in position.

The above-described pouch 31, with its viscoelastic effects, can also serve as a bedsores-preventing mattress, or as a mattress for premature babies, etc.

Understandably, all the features illustrated in FIGS. 6 and 7 may be incorporated into the embodiment illustrated in FIG. 11. The compartmenting according to FIG. 8 causes, for example, the rigidified housing 103 to behave as a plurality of rigid "facets" with slight articulation between them: as a result, the bedsores-preventing mattress according to the invention adopts perfectly the form of the patient in the desired position, while tolerating changes of position of the patient.

FIGS. 12 and 13 illustrate the principle of a machine for producing the padded product of FIG. 5.

Beforehand, the two layers 21 and 22 have been assembled by parallel seams 23 with a sewing-machine which can work simultaneously through the whole width of the layers (for example 1.60 m or 3.20 m), and by a transversal seam 25 designed to close one side of the mattress.

Then, the ends of filling pipes 130 are introduced into the open ends of the parallel tubes thus formed. In fact, according to the embodiment illustrated in FIGS. 12 and 13, the tubes are placed over the filling pipes 130, and are turned up slightly over said pipes 130 due to rollers 131 covered with a friction material rotatable in the direction of the arrows (FIG. 12), until the bottom of the tubes corresponding to seam 25 reaches substantially the level of the end of the filling pipes 130.

Pipes 130 can be partly flexible, or they can be rigid. In this case, the spacing of them must be that of the tubes in the filled state.

Then, granular material is injected into the hoses, the effect of which is to push the swollen tubes as they are being filled, toward the right in FIGS. 12, 13.

The rollers 131 are used for braking the backing movement of the mattress and for allowing its uniform and slightly pressurized filling (by stretching the fabric constituting the layers).

When the desired length of padded product has been filled, then its open end is closed, for example by another transversal seam.

The discharge end of pipes 130 may be cylindrical or preferably funnel-shaped, thus helping the injection of low density materials, and permitting that the fabric be stretched over the funnel.

It is conceivable that instead of having to assemble the layers 21, 22 by said parallel longitudinal seams beforehand, this assembling operation can be performed simultaneously with the filling operation, a little upstream thereof, by: bringing the layers 21, 22 continuously by the top and by the bottom; continuously sewing them longitudinally; and, at predetermined intervals, closing them transversally.

The transversal closures may be produced:
by seams (using an overcasting machine or by a chain stitching machine),
by heat-sealing using another material such as polyethylene, if the material constituting the padded product is quite thin and aerated,
by adhesive bonding, using various resins,
by folded edge clipping,
by steam-press permitting the compacting and welding of the polystyrene to the bag heads over a one-centimeter width.

The pipes 130 are advantageously fed with granular material as follows.

A feeding box 132 is placed under a hopper 133 and receives the loose particled material 134. The upstream ends of the pipes 130 are placed horizontally inside said box 132 and comprise a funnel-shaped inlet 135. Coaxially to and upstream of said inlets 135, injectors 136, supplied by a common pipe 137 connected with a source of pressurized air, inject a jet of pressurized air carrying with it the surrounding particled material and the force to penetrate into the funnel 135 and the pipes 130. The diameter of these pipes is greater than the diameter of injectors 136. The flowing of the fluid is thus made easier and causes a suction effect by the funnels 135. The injectors 136 can be at a certain distance from the funnels 135, or, when the respective diameters allow it without any excessive restriction of the passage left for the granular material, they can be fitted in the pipes 130, which causes an even greater suction effect. According to one embodiment intended to be filled with balls of expanded polystyrene, the following configuration has been found to give satisfactory results: diameter of the injectors 136: 6 mm, diameter of the pipes 130: 14 mm and the largest diameter of the funnels 135: 24 mm, a distance of 18 mm separating the injectors 136 from the funnels 135. To prevent any interferences between possible turbulence close to the outlets of injectors 136, separating walls 138 are provided inside the box 132 between adjacent injectors 132 and funnels 135.

The above-described padded product filling method is particularly advantageous in that it has little or no inertia, it permits a uniform and complete filling without creating in the padded products any excessive pressures which may give rise to bulges in the material.

Up to now, it has been assumed that the granular material has been injected in its final form: for example, in the form of balls of expanded polystyrene.

It is also in accordance with the invention to inject the granular material in an intermediate state: for example, in the form of crude, non-expanded polystyrene. In this case, the fabric of the padded product must be a fabric which can withstand the temperature of expansion (800°-100°), which expansion will be carried out in situ.

The tubes are filled to about one seventh of their volume, and the whole assembly is brought into an alternating and sweeping stream of hot air, to ensure the mobility of the grains of polystyrene during the expansion and to prevent clustering. It is also possible to ensure mechanical mobility of the layer of fabric caught in a supporting frame pivoted automatically.

The advantage of this method is that it makes it possible to store an intermediate padded product within a small volume, to reduce transporting costs, and to ensure ready closing of the material after filling. On the other hand, said method requires the subsequent step of expansion, and the final product thus obtained shows none of the tension of the material observed according to the first method.

It is also possible, instead of starting with a crude polystyrene, to start with a half-pre-expanded polystyrene of which the expansion is completed in situ.

I claim:

1. A device for cushioning an object comprising:
   (a) a quantity of granular material;
   (b) a retaining element defining a plurality of closed chambers, each closed chamber enclosing a portion of the granular material such that the entire quantity of granular material is enclosed by the retaining element the retaining element made of material that is permeable to gas and impermeable to the granular material;
   (c) a sealed housing defining an enclosed inner volume and enclosing the retaining element within the enclosed inner volume, the sealed housing being made of a supple material impermeable to gas; and
   (d) means to depressurize the enclosed inner volume of the sealed housing, the retaining element preventing any excessive accumulation of the granular material in a particular part of the enclosed inner volume before depressurization.

2. The device according to claim 1 wherein the sealed housing (10) is in envelope form, inside which envelope can be placed the object to be cushioned, said envelope being provided with a flap (14) equipped with instant closing means.

3. The device according to claim 1 wherein the retaining element (20) comprise a mattress of juxtaposed tubes defined by walls (21, 22) of a supple material which is impermeable to the granular material filling the tube.

4. The device according to claim 3 wherein the supple material forming the walls of the juxtaposed tubes is a textile material.

5. The device according to claim 4 wherein the textile material is partly elastic in a direction transversal to the length of the juxtaposed tubes.

6. The device according to claim 1 further comprising at least a second sealed housing (32, 102, 118), adjoined to said depressurizable sealed housing (33, 103).

7. The device according to claim 6 wherein the second sealed housing (32, 102, 118) contains fluid material.

8. The device according to claim 7 further comprising a third sealed housing (118) designed to contain a fluid, the depressurizable sealed housing (103) being interposed between the second (102) and the third (118) sealed housings.

9. A device according to claim 6 wherein the second sealed housing contains a granular material.

10. A method of cushioning an object comprising the steps of:
   (a) providing a cushioning device comprising:
      (i) a quantity of granular material;
      (ii) a retaining element defining a plurality of closed chambers, each closed chamber enclosing a portion of the granular material such that the entire quantity of granular material is enclosed by the retaining element the retaining element made of a material that is permeable to gas and impermeable to the granular material;
      (iii) a sealed housing defining an enclosed inner volume and enclosing the retaining element within the enclosed inner volume, the sealed housing being made of a supple material impermeable to gas; and
      (iv) means to depressurize the enclosed inner volume, the retaining element preventing any excessive accumulation of the granular material in a particular part of the enclosed inner volume before depressurization;
   (b) placing the object in the cushioning device; and
   (c) depressurizing the enclosed inner volume.

11. The device according to claim 1 wherein the plurality of closed chambers are defined by boundary seams extending in generally orthogonal directions.

* * * * *